United States Patent Office 3,422,739
Patented Jan. 21, 1969

3,422,739
IMAGE-MOTION COMPENSATING MECHANISM
FOR PANORAMIC AERIAL CAMERAS
Jacob P. Zilko, Roslyn Heights, N.Y., and Leonard I. Sherry, Los Angeles, Calif., assignors to Fairchild Camera and Instruments Corporation, a corporation of Delaware
Filed Oct. 24, 1966, Ser. No. 588,855
U.S. Cl. 95—12.5    12 Claims
Int. Cl. G03b 29/00

This invention relates to image-motion compensating mechanisms for panoramic aerial cameras and particularly to such mechanisms of the type applicable to an aerial camera adapted to be mounted with its optical axis at an angle to the vertical in the direction of flight.

While an aerial camera is usually mounted with its optical axis vertical, it is frequently of advantage to mount it in the flight vehicle with its optical axis at an angle to the vertical in the direction of flight in order to permit the taking of pictures at a forward or aft oblique, thereby establishing a viewing angle suitable for stereoscopic photography.

When a panoramic aerial camera is mounted in an inclined position, as described, it will have present at the focal plane, during exposure, image motion which has vector components in the direction of flight and along the direction of scan at right angles to the flight direction at every point on the format excepting those points which describe a line along the flight axis at an angle of scan coincident with the nadir.

Heretofore there have been devised various types of image-motion compensating mechanisms for compensating for the apparent image motion in the direction of flight, such as the image-motion compensating mechanism described and claimed in Patent 3,160,082 to Lysle. In general, prior image-motion compensating mechanisms have not had the capability of compensating also for image motion transverse to the direction of flight when the camera is mounted with its optical axis inclined to the vertical.

It is an object of the invention, therefore, to provide a new and improved image-motion compensating mechanism for a panoramic aerial camera which has the capability of compensating for image motion both in the direction of flight and transverse thereto.

It is another object of the invention to provide a new and improved image-motion compensating mechanism for a panoramic aerial camera of simple and rugged construction capable of compensating for image motion either in the direction of flight or, alternatively, both in the direction of flight and transverse thereto.

In accordance with the invention, there is provided a panoramic aerial camera adapted to be mounted with its optical axis at an angle to the vertical in the direction of flight, an optical scanning mechanism providing image-motion compensation in the direction of flight and transverse thereto comprising an objective lens unit, means for imparting angular motion to the lens unit about an axis normal to the principal ray of the lens unit and in the general direction of flight, mounting means for the lens unit providing for translatory movement thereof in the direction of flight and transverse thereto, first means responsive to motion of the lens unit about its axis for imparting thereto oscillatory translatory motion in the direction of flight, and second means responsive to motion of the lens unit about its axis for imparting thereto oscillatory translatory motion transverse to the direction of flight, the last two means being proportioned respectively to compensate for the vectors of image motion in the direction of flight and transverse thereto. The term "vertical" is used herein and in the appended claims to indicate direction assuming the normal horizontal attitude of the craft in flight. The term "direction of flight" is used herein and in the appended claims in either sense, that is, to indicate either the fore or aft direction.

Further in accordance with the invention, there is provided in a panoramic aerial camera, an optical scanning mechanism providing image-motion compensation in the direction of flight comprising an objective lens unit, means for oscillating the lens unit about an axis normal to the principal ray of the lens unit and in the general direction of flight, mounting means for the lens unit providing for translatory movement thereof in the direction of flight and transverse thereto, and means responsive to motion of the lens unit about its axis for imparting thereto oscillatory translatory motion in the direction of flight, the last-named means being proportioned to compensate for the apparent image motion in the direction of flight.

For a better understanding of the present invention, together with other and further objects thereof, reference is had to the following description, taken in connection with the accompanying drawings, while its scope will be pointed out in the appended claims.

Referring now to the drawings:

FIGS. 1 and 2 are diagrams to aid in explanation of the invention, while

Figure 1:
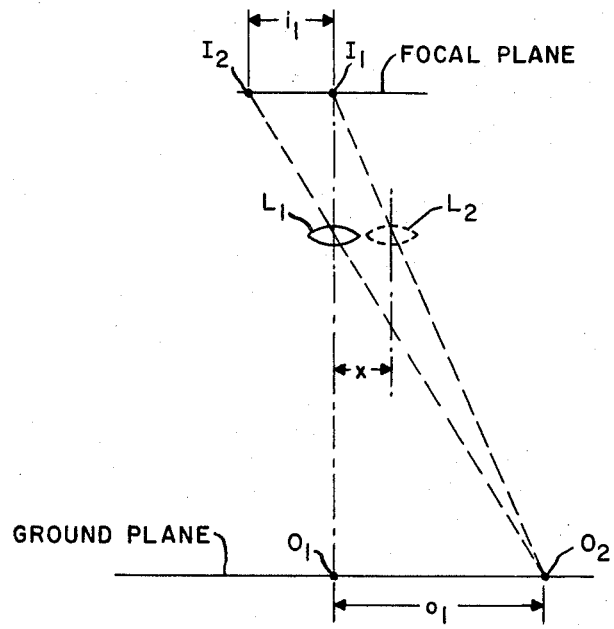

Before describing the image-motion compensation mechanism embodying the invention, it will be helpful to explain certain fundamental principles on which it is based. As stated above, if a panoramic aerial camera is mounted in a flight vehicle with its optical axis inclined to the vertical in the direction of flight, there will be an apparent image motion having vector components in the direction of flight and transverse thereto. FIG. 1 schematically represents the situation in which an object has apparently moved from a position $O_1$, at the beginning of an exposure period, a distance $o_1$ in the direction of flight to position $O_2$ at the end of the exposure period. If no compensation is provided, the image would move during this period a distance $i_1$ from position $I_1$ to position $I_2$, resulting in a smearing of the image on the film. In the figure, the object and image motions are considerably exaggerated for the sake of clarity.

However, if the objective lens of the camera, during this exposure period, is moved through a distance $x$ in the direction of flight from position $L_1$ to $L_2$, then it is seen that the image remains stationary at the position $I_1$ at the focal plane of the camera. It can be shown that the motion of the lens in the direction of flight, hereinafter referred to as forward motion compensation, should satisfy the equation:

$$v_f = -fV/H \qquad (1)$$

wherein:

$v_f$ = forward velocity of the lens motion
$f$ = focal length of the lens
$V$ = velocity of the vehicle
$H$ = altitude of the vehicle above the object being photographed.

Figure 2:
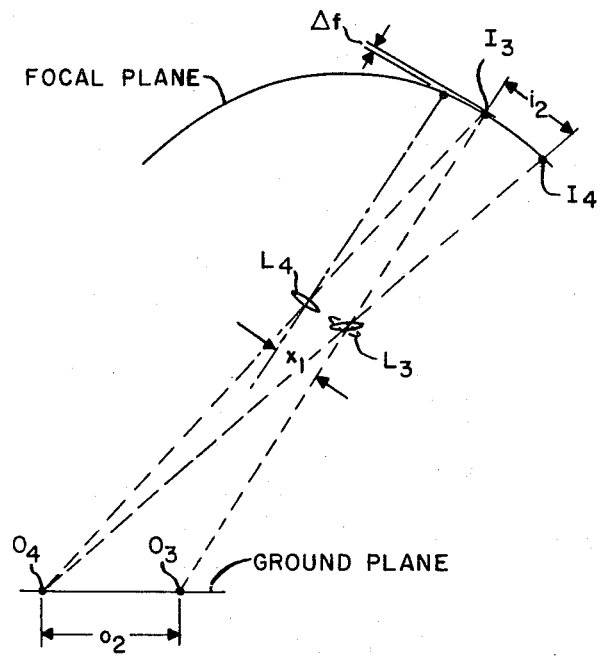

Referring now to FIG. 2, there is shown schematically the manner in which, at one extreme position of the optical scanning device, an object apparently moves transverse to the direction of flight by a distance $o_2$ from a position $O_3$ at the beginning of the exposure period to $O_4$ at the end of the period. Again, if there is no compensation, the image will move during the exposure period a distance $i_2$ from position $I_3$ to position $I_4$ and this would further cause a smearing of the exposed image. However, by moving the lens through distance $x_1$, the image remains stationary at $I_3$. It can be shown that the motion of the lens transverse to the direction of flight, hereinafter called side-motion compensation, should satisfy the equation:

$$v_s = -\frac{1}{4}\frac{V}{H}f \sin 2\phi \cos 2\omega t \qquad (2)$$

where:

$v_s$=side-motion velocity of the lens
$f$=focal length of lens
$\phi$=angle of forward or aft inclination of the camera
$\omega$=scan angular velocity
$t$=time, $t=0$ at nadir position.

Actually, side-motion compensation should be made by moving the camera lens along an arc concentric to the focal plane, rather than along a straight line, if theoretically correct side-motion compensation is desired. Since the side-motion compensation in most applications requires only a very slight motion of the lens, a considerable simplification in mechanization of the device can be achieved by moving the lens along a straight line rather than along an arc concentric to the platen. This line must be perpendicular to the lens principal axis and a distance from the focal plane optimized for minimum defocus. This simplification will cause of slight change of focus $\Delta f$, as shown in FIG. 2, and a small error in side-motion compensation. However, these errors, in most applications, are of theoretical interest only and do not cause any measurable degradation in camera performance.

Figure 3:
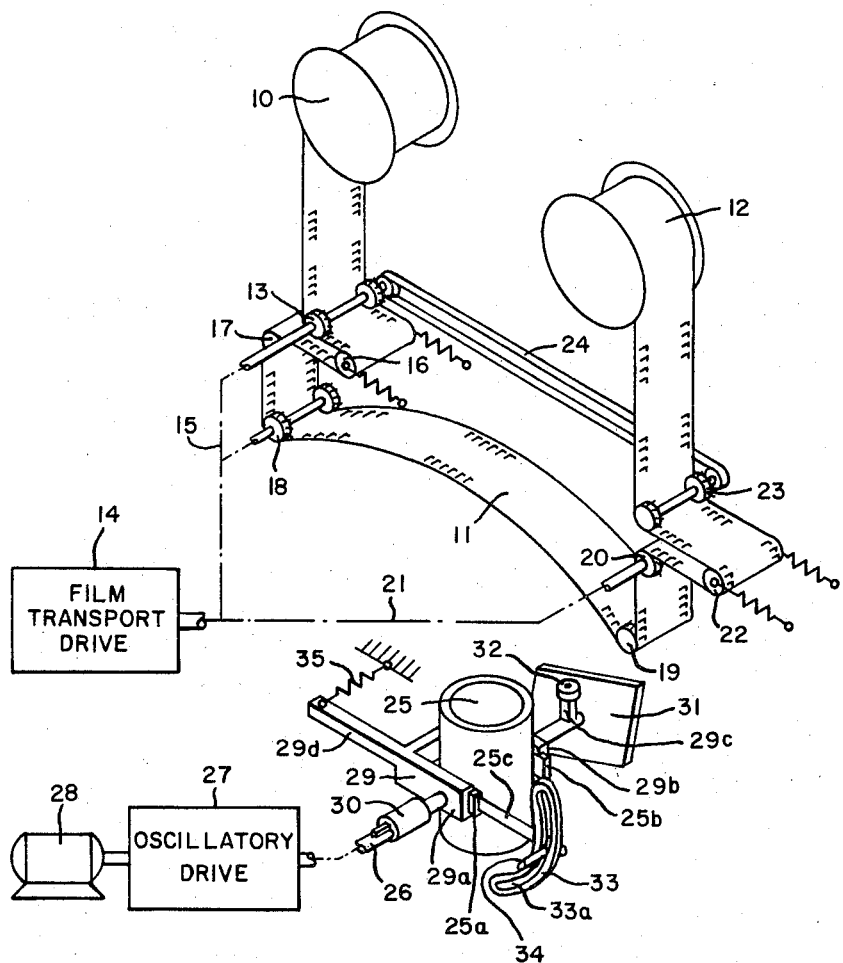
FIG. 3 is a perspective view, partly schematic, of an image-motion compensating mechanism for a panoramic aerial camera embodying the invention.

Referring now to FIG. 3, there is shown, partly schematically, an image-motion compensating mechanism for a panoramic aerial camera embodying the invention. The focal plane camera of FIG. 3 is shown as embodying a conventional film transport including a supply spool 10 for a strip film 11 and a takeup spool 12. The film transport may, for example, be of the type described and claimed in Patent 3,250,194 to Lysle. The film passes, in sequence, over a drive sprocket 13 driven by a film transport drive unit 14 via a driving connection, shown schematically at 15, slack loop roller 16, idler roller 17, a drive sprocket 18, an idler roller 19, a drive sprocket 20 driven by the unit 14 via a mechanism shown schematically at 21, a slack loop roller 22, and a drive sprocket 23 driven from the drive sprocket 13 via a belt 24. It is assumed that the drive for the film transport is of the type in which the film remains stationary during the exposure period and is advanced by one frame in the interval between exposure periods. However, the film-transport mechanism, per se, forms no part of the present invention and is therefore shown schematically. It is assumed that, during exposure, the film 11 is held in arcuate form in the focal plane of the camera, as by a conventional vacuum platen, not shown.

It is assumed that, in operation, the panoramic aerial camera of FIG. 3 is mounted in a flight vehicle with its axis at an angle to the vertical in the direction of flight. The panoramic camera of FIG. 3 includes an optical scanning mechanism providing image-motion compensation, both in the direction of flight and transverse thereto, comprising an objective lens unit 25 which will generally comprise a conventional composite lens. The apparatus includes means for imparting angular motion to the lens unit 25 about an axis normal to the principal ray of the lens unit and in the general direction of flight. For example, the unit 25 may be mounted on a drive shaft 26 mounted generally in the direction of flight and driven by any suitable means for imparting angular motion thereto, either continuous rotation or oscillatory motion. There is specifically shown a means of the latter type comprising an oscillatory drive mechanism 27 driven by a motor 28. The apparatus further comprises mounting means for the lens unit 25 providing for translatory movement thereof both in the direction of flight and transverse thereto. This mounting means may be in the form of a supporting frame 29 having an integral hub 30 splined on the shaft 26 and providing a pair of slides 29a, 29b in which complementary guides or slides 25a, 25b are mounted for providing transverse translatory movement of lens unit 25. The frame 29 is biased to the right, as seen in FIG. 3, by means of a spring 35 attached to an arm 29d extending from the frame.

The image-motion compensating mechanism of the camera of FIG. 3 further comprises means responsive to motion of the lens unit 25 about its axis for imparting thereto oscillatory translatory movement in the direction of flight. Specifically, there is provided a reaction plate 31 having a surface inclined to the axis of shaft 26 and a cam-follower or roller 32 attached to an extension 29c of frame 29. The reaction of roller 32 against the reaction plate 31 caused by the tension of spring 35 during oscillation of the lens unit 25 imparts the desired image-motion compensation in the direction of flight as represented by Equation 1.

The image-motion compensation mechanism of the camera of FIG. 3 further comprises means responsive to motion of the lens unit 25 about its axis for imparting thereto oscillatory translatory movement transverse to the direction of flight. This last means may be in the form of a cam 33 having a cam slot 33a of a configuration derived from Equation 2. Engaging the cam slot 33a is a cam-follower or pin 34 mounted on an extension 25c of slide element 25a.

It is believed that the operation of the image-motion compensating mechanism of the camera of FIG. 3 will be apparent from the foregoing description. In brief, during an exposure period, the lens unit 25 is oscillated in a plane transverse to the direction of flight to scan the terrain below over an appropriate angle, this oscillation being effected by the motor 28, the drive 27, and the shaft 26. The cam-follower 32 is biased into engagement with the reaction plate 31 by means of the spring 35 so that, during its oscillation, the frame 29 slides back and forth along the splined shaft 26 to impart to the lens unit an image-motion compensation in accordance with Equation 1 to compensate the image motion in the direction of flight.

Concurrently, as the lens unit 25 is oscillated as described, the cam-follower 34 engaging the cam slot 33a imparts to the lens unit 25 translatory motion via the slides 29a, 29b and 25a, 25b to impart thereto a translatory motion transverse to the direction of flight in accordance with Equation 2, thereby compensating for the apparent image motion in that direction.

In the event that the camera should be mounted with its optical axis in the vertical, the mechanism described, including the frame 29 splined on the drive shaft 26 and given an oscillating translatory movement in the direction of flight, still constitutes a novel image-motion compensating mechanism for compensating for the apparent image motion in the direction of flight.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a panoramic aerial camera adapted to be mounted with its axis at an angle to the vertical in the direction of flight, an optical scanning mechanism providing image-motion compensation in the direction of flight and transverse thereto comprising:

an objective lens unit;
means for imparting angular motion to said lens unit about an axis normal to the principal ray of the lens unit and in the general direction of flight;
mounting means for said lens unit providing for translatory movement thereof in the direction of flight and transverse thereto;

first means responsive to motion of said lens unit about its axis for imparting thereto oscillatory translatory movement in the direction of flight;

and second means responsive to motion of said lens unit about its axis for imparting thereto oscillatory translatory movement transverse to the direction of flight, said last two means being proportioned respectively to compensate for the vectors of image motion in the direction of flight and transverse thereto.

2. An optical scanning mechanism in accordance with claim 1 in which the lens unit moving means includes an oscillatory drive shaft on which said lens unit is supported.

3. An optical scanning mechanism in accordance with claim 2 in which the mounting means for said lens unit includes a supporting frame splined on said drive shaft.

4. An optical scanning mechanism in accordance with claim 3 in which said first means comprises cam and cam-follower elements, one of said elements being attached to said frame.

5. An optical scanning mechanism in accordance with claim 1 in which the mounting means for said lens unit includes a pair of slides providing for transverse translatory movement thereof.

6. An optical scanning mechanism in accordance with claim 3 in which said frame is provided with a pair of slides in which said lens unit is mounted.

7. An optical scanning mechanism in accordance with claim 5 in which said second means comprises a reaction plate element and a cam-follower element, one of said elements being attached to said lens unit.

8. An optical scanning mechanism in accordance with claim 1 in which said first means imparts a velocity to said lens unit in the direction of flight represented by the equation:

$$v_f = -fV/H \cos \omega t$$

where $v_f$ = forward velocity of the lens motion
$f$ = focal length of the lens
$V$ = velocity of the vehicle
$H$ = altitude of the vehicle above the object being photographed
$\omega$ = scan angular velocity
$t$ = time, $t=0$ at nadir position.

9. An optical scanning mechanism in accordance with claim 1 in which said second means imparts a velocity to said lens unit in a direction transverse to the direction of flight represented by the equation:

$$v_s = -\frac{1}{4}\frac{V}{H}f \sin 2\phi \cos 2\omega t$$

where $v_s$ = side motion velocity of the lens
$f$ = focal length of lens
$\phi$ = angle of forward or aft inclination of the camera
$\omega$ = scan angular velocity
$t$ = time, $t=0$ at nadir position.

10. In a panoramic aerial camera, an optical scanning mechanism providing image-motion compensation in the direction of flight comprising:

an objective lens unit;

means for imparting angular motion to said lens unit about an axis normal to the principal axis of said lens unit and in the general direction of flight;

mounting means for said lens unit providing for translatory movement thereof in the direction of flight and transverse thereto;

and means responsive to motion of said lens unit about its axis for imparting thereto oscillatory translatory movement in the direction of flight, said last-named means being proportioned to compensate for the image motion in the direction of flight.

11. An optical scanning mechanism in accordance with claim 10 in which the lens unit moving means includes an oscillatory drive shaft and in which the mounting means for said lens unit includes a supporting frame splined on said shaft.

12. An optical scanning mechanism in accordance with claim 10 in which said means for imparting translatory movement to said lens unit comprises reaction-plate and cam-follower elements, one of said elements being attached to said lens unit.

References Cited

UNITED STATES PATENTS 2,899,882  8/1959  Wylie _____ 95—12.5

JOHN M. HORAN, *Primary Examiner.*